United States Patent [19]

Sikula

[11] 4,067,531
[45] Jan. 10, 1978

[54] VIBRATION ISOLATION AND SEALING GASKET

[75] Inventor: William John Sikula, Waterloo, Iowa

[73] Assignee: Derre & Company, Moline, Ill.

[21] Appl. No.: 707,622

[22] Filed: July 22, 1976

[51] Int. Cl.² ............................................. F16F 15/04
[52] U.S. Cl. ............................... 248/358 R; 277/211; 248/22
[58] Field of Search ................. 248/15, 22, 24, 358 R; 277/211

[56] References Cited

U.S. PATENT DOCUMENTS

| 2,515,422 | 7/1950 | Pietz | 248/358 R |
|---|---|---|---|
| 2,893,722 | 7/1959 | Beck | 248/27 |
| 3,128,999 | 4/1964 | Schmitt | 248/358 R |
| 3,215,253 | 11/1965 | Grantham | 248/358 R |
| 3,223,374 | 12/1965 | Butler et al. | 248/358 R |
| 3,319,918 | 5/1967 | Rapata | 248/358 R |
| 3,479,081 | 11/1969 | Schaaf | 248/15 |
| 3,540,747 | 11/1970 | Stuernstrom | 277/211 |
| 3,738,670 | 6/1973 | Jelinek et al. | 277/211 |

Primary Examiner—Robert A. Hafer

[57] ABSTRACT

A vibration isolation and sealing gasket for a cover mountable on a vibratable engine includes a pair of identical, oblong bead-shaped sealing portions, connected by a rectangular intermediate flange portion, sealingly positioned beneath the outer periphery of the cover. The intermediate portion has a plurality of convolutable, cylindrical protrusions extendable through clearance holes in the cover and having through holes concentric therewith for the insertion of bolts to convolute the protrusions and secure the cover to the engine. The protrusions further include integrally molded sleeves of a predetermined length to maintain predetermined minimum convoluted and compressed thicknesses of the gasket so as to maintain substantially equal spring rates in the convoluted and compressed portions of the gasket when the cover is tightly secured to the engine. In an alternate embodiment, a single bead-shaped sealing portion having a plurality of flange portions, each with a convolutable protrusion and an integrally molded sleeve, is utilized to seal and vibration isolate the cover from the vibratable engine.

11 Claims, 7 Drawing Figures

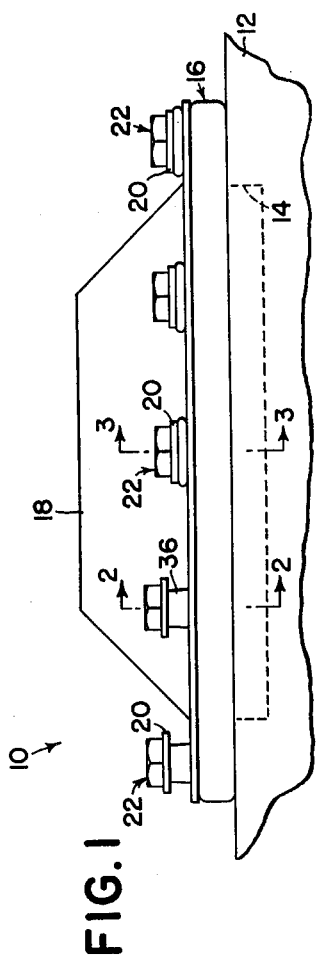
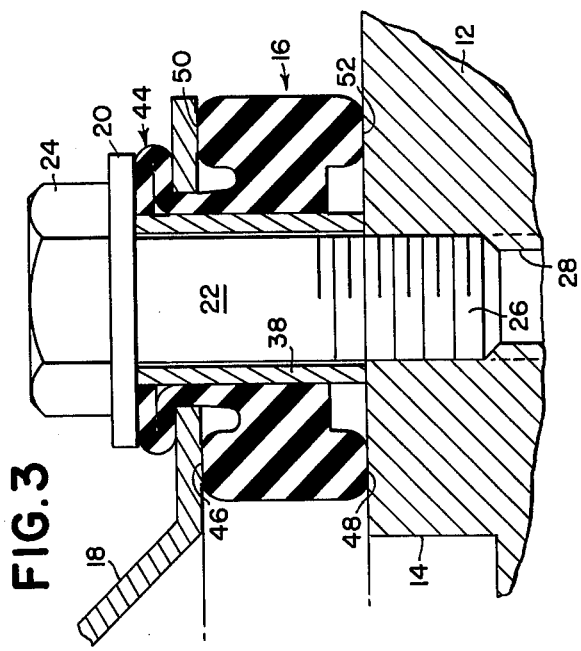
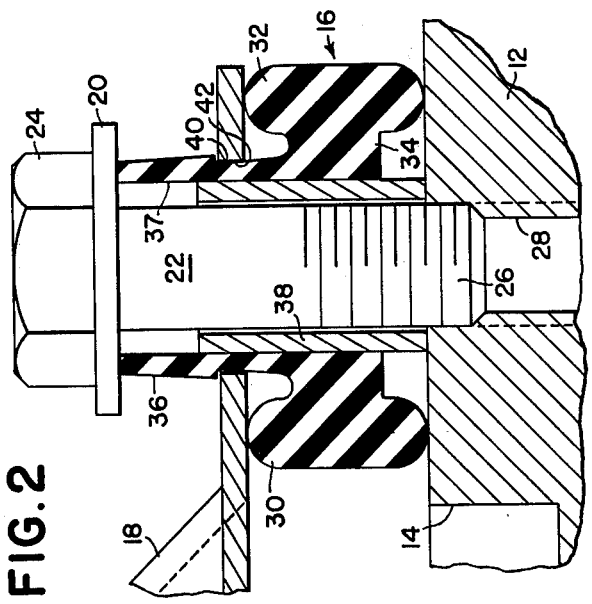

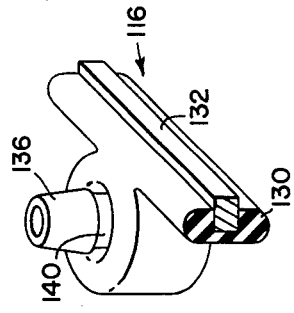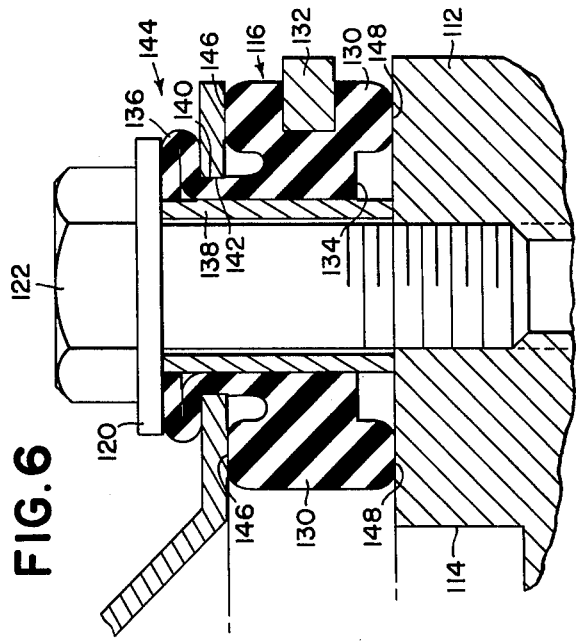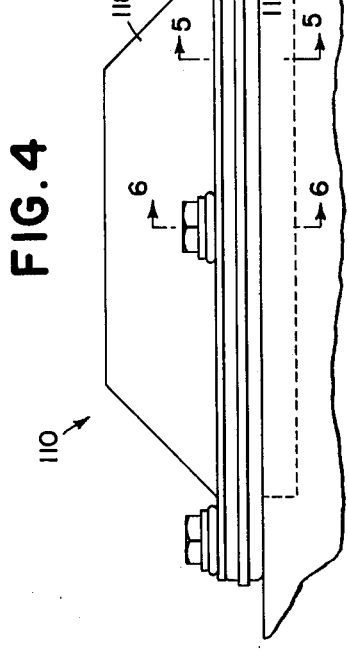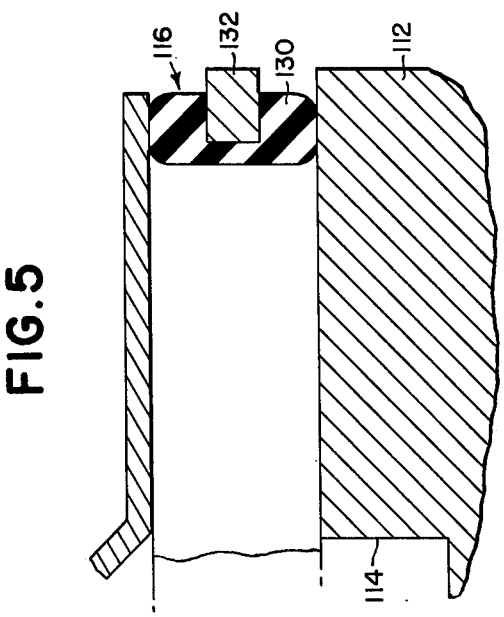

VIBRATION ISOLATION AND SEALING GASKET

BACKGROUND OF THE INVENTION

The present invention relates generally to systems for isolating covers from vibratable bases as shown in the co-pending application Ser. No. 685,455 and more particularly to a vibration isolation and sealing gasket to be used in such a system.

In the past, most vibration isolation systems have relied on trial and error methods of isolation by adding different materials between a cover and its associated vibratable base, and attempts to reduce bolt transmitted vibrations by using the same resilient material in washers between the bolt heads and the cover as in the gaskets have not been entirely successful because the compression necessary for proper sealing reduced the isolation capabilities of the gaskets. Further, assembly of these systems is time consuming because of the number of separate components required.

SUMMARY OF THE INVENTION

The present invention provides a vibration isolation and sealing gasket, a sealing portion of which is insertable between a cover and a vibratable base, and an intermediate portion of which includes toroidal protrusions insertable through clearance holes in the cover to be convolutedly compressed by the tightening of the bolts to form grommets under the bolt heads. The gasket includes integrally molded sleeves in the protrusions to limit the compression of the sealing and the protrusion portions so as to provide the spring same rate in both portions upon tightening of the bolt so as to minimize vibration isolation of the cover as well as the sealing efficiency of the gasket.

The above and additional advantages of the present invention will become apparent to those skilled in the art from a consideration of the following detailed description of the preferred embodiment taken in conjunction with the accompanying drawings.

BRIEF DESCRIPTION OF THE DRAWINGS

FIG. 1 is a side view of an assembly incorporating a preferred embodiment of the present invention;

FIG. 2 is a cross-sectional view taken along the line 2—2 of FIG. 1;

FIG. 3 is a cross-sectional view taken along line 3—3 of FIG. 1;

FIG. 4 is a side view of an assembly incorporating an alternate preferred embodiment of the present invention;

FIG. 5 is a cross-sectional view taken along line 5—5 of FIG. 4;

FIG. 6 is a cross-sectional view taken along line 6—6 of FIG. 4; and

FIG. 7 is an isometric view of a portion of the alternate preferred embodiment.

DESCRIPTION OF THE PREFERRED EMBODIMENT

Referring now to FIG. 1, therein is shown a vibration isolation system 10 which includes a vibratable engine or base 12 having an engine cavity or opening 14 provided therein, a gasket 16 encircling the opening 14, and a cover 18 covering the opening 14 and secured to the vibratable base 12 by bolts 22 passing through washers 20.

Referring now to FIG. 2, therein is shown a cross-section of the gasket 16 with the bolt 22 in an untightened position. The bolt 22 having a bolt head 24 and a threaded portion 26 is lightly threaded into a threaded hole 28 in the vibratable base 12. The gasket 16 includes a pair of oblong bead-shaped sealing portions 30 and 32 which have similar cross-sections and which are connected by a rectangular flange portion 34. The flange portion 34 includes a plurality of cylindrical protrusions 36 axially perpendicular to the plane of the bead-shaped portions 30 and 32. Each of the protrusions 36 has a through hole 37 in which is molded a cylindrical sleeve 38 which is generally metallic. The protrusions 36 further have annular relief grooves 40 provided therearound proximate the flange portions 34, of substantially the same diameter as clearance holes 42 provided in the cover 18.

As may be seen by reference to FIG. 3, when the bolt 22 is tightened into the threaded hole 28 until the washer 20 abuts the sleeve 38, the gasket 16 will be compressed until the bead-shaped portions 30 and 32 are deformed to form sealing surfaces 46 and 48, and 50 and 52, respectively, and the protrusions 36 will be deformed into a convoluted configuration or grommet as designated by the numeral 44.

To assemble the vibration isolation system 10, the protrusions 36 are first press fit into the clearance holes 42 in the cover 18 and held in place thereby. The cover 18 with the gasket 16 held in place is then placed against the vibratable base 12 and the bolts 22, encircled by the washers 20, are inserted through the protrusions 36 and the sleeves 38 to be threaded into the threaded holes 28. As the bolts 22 are tightened down to a position set by the length of the sleeve 38, the gakset 16 will deform so as to form the convolutions 44 above the cover and the sealing surfaces 46, 48, 50, and 52 between the cover 18 and the base 12.

The durometer of the gasket 16 as well as the wall thickness of the protrusions 36 are selected so as to provide approximately equal spring rates between the washer 20 and the cover 18 and between the cover 18 and the vibratable base 12 as explained in greater detail in the co-pending application Ser. No. 685,455 which is herewith incorporated by reference thereto. And further, as evident to those skilled in the art from a reading of the co-pending application, the sleeve 38 length is sized so as to provide a minimum compression of the gasket 16 between the cover 18 and the vibratable base 12 of 10% of at least the uncompressed height.

Referring now to FIG. 4, therein is shown an alternate preferred embodiment of a vibration isolation system 110 which includes a vibratable engine or base 112 having an engine cavity or opening 114 provided therein, a gasket 116 encircling the opening 114, and a cover 118 covering the opening 114 and secured to the vibratable base 112 by bolts 122 passing through washers 120.

Referring now to FIG. 5, therein is shown a cross section of the gasket 116 which includes an oblong bead-shaped sealing portion 130 with the major axis of the oblong perpendicular to the surface of the base 112 and a stabilizing band 132 embedded in the sealing portion 130 which is of a material such as a metal which is rigid enough to withstand any tendency of the major axis of the sealing portion 130 to move out of perpendicularity with the surface of the base 112.

Referring now to FIG. 6, therein is shown a cross section of the gasket 116 in the area of one of the bolts 122 which is threaded into a threaded hole 128 in the base 112. In this area, the gasket 116 includes a flange portion 134 encircled by the sealing portion 136 and having one of a plurality of cylindrical protrusions 136 which are positioned axially perpendicular to the flange portion 134 and perpendicular to the plane of a closed loop defined by the gasket 116. The protrusion 136 and the flange portion 134 contain a through hole into which is molded a cylindrical sleeve 138. The protrusions 136 further have an annular relief groove 140 provided therearound proximate the flange portion 134, of substantially the same diameter as clearance holes 142 provided in the cover 118.

The bolt 122 is shown tightened into the threaded hole 128 until the washer 20 abuts the sleeve 138 compressing the gasket 116 until the oval bead-shaped sealing portion 130 is deformed to form sealing surfaces 146 and 148 and the protrusion 136 is deformed into a convoluted configuration or isolating grommet as designated by the numeral 144.

To assemble the vibration isolation system 110, the protrusions 136 of the gasket 116 are first press fit into the clearance holes 142 and then held in place thereby. The cover 118 with the gasket 116 held in place is then placed against the vibratable base 112 and the bolts 122, encircled by the washers 120, are inserted through the protrusions 136 and the sleeves 138 to be threaded into the threaded holes 128. As the bolts 122 are tightened down to the position set by the length of the sleeve 38, the gasket 116 will deform so as to form the convolutions 144 above the cover and the sealing surfaces 146 and 148 and between the cover 118 and the base 112.

The durometer of the gasket 116 as well as the wall thickness of the protrusions 136 are selected so as to provide equal spring rates between the washer 120 and the cover 118 and between the over 118 and the vibratable base 112 as explained in greater detail in the copending application Ser. No. 685,455. And further, as also explained in the copending application, the sleeve 138 length is sized so as to provide a minimum compression of the gasket 116 between the cover 18 and the vibratable base 12 of 10% of the uncompressed height.

Referring now to FIG. 7, therein is shown an isometric of a portion of the gasket 116 in the uncompressed condition in the area around one of the protrusions 136.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. A vibration isolation and sealing gasket comprising: a bead-shaped sealing portion having a pair of surfaces compressible to at least a predetermined minimum compression to form a pair of parallel sealing surfaces having a first spring rate therebetween, flange means connected adjacent to the sealing portion between a pair of parallel sealing surfaces and distal therefrom, a plurality of cylindrical protrusions extending from the flange means perpendicular to the pair of parallel sealing surfaces, each of said plurality of cylindrical protrusions having a through-hole provided therein concentric therewith and being axially deformable to form a plurality of compressed protrusions having a combined axial spring rate approximately equal to said first spring rate of the sealing portion between the pair of parallel sealing surfaces, and stabilizing means integral with the sealing portion for holding the sealing portion in a fixed position relative to the cylindrical protrusions.

2. The gasket as claimed in claim 1 wherein the bead-shaped sealing portion forms a closed loop and the stabilizing means is a band of material encircling the sealing portion and of a different material from the sealing portion.

3. The gasket as claimed in claim 1 including a plurality of sleeve means disposed within said plurality of through-holes for establishing said minimum compression of the parallel sealing surfaces.

4. The gasket as claimed in claim 1 wherein the plurality of cylindrical protrusions each have an annular relief groove provided therearound proximate the intermediate portion.

5. The gasket as claimed in claim 1 wherein the flange means defines a plurality of flanges and portions of the bead-shaped sealing portion encircle the plurality of flanges.

6. The gasket as claimed in claim 1 wherein the bead-shaped sealing portion forms a closed loop and the stabilizing means is a second bead-shaped sealing portion parallel to the first mentioned bead-shaped sealing portion and connected thereto by the flange means.

7. In a vibration isolation system including vibratable base means having a plurality of threaded holes provided therein in a predetermined closed pattern, cover means spaced apart from the base means having a plurality of clearance holes provided therein in a pattern corresponding to the pattern of said threaded holes, and a plurality of bolt means having head means and inserted through said clearance holes and tightened into the theaded holes, a vibration isolation and sealing gasket comprising: a bead-shaped sealing portion encircling the predetermined closed pattern and having a pair of surfaces compressible between the cover means and the base means to at least a predetermined minimum compression to form a pair of parallel sealing surfaces having a first spring rate therebetween, flange means connected adjacent to the sealing portion between the pair of parallel sealing surfaces and distal therefrom, a plurality of cylindrical protrusions parallel to the plurality of bolt means, each of said plurality of cylindrical protrusions having a concentric through hole for passage of the bolt means therethrough to axially convolute the cylindrical protrusions between the plurality of head means and the cover means so as to provide a spring rate therebetween approximately equal to the first spring rate between the parallel sealing surfaces, and stabilizing means integral with the sealing portion for holding the sealing portion in a fixed position relative to the cylindrical protrusions.

8. The gasket as claimed in claim 7 including a plurality of sleeve means disposed within said through holes encircling the plurality of bolt means and having predetermined lengths to limit tightening of the plurality of bolt means so as to establish the minimum compression of the parallel sealing surfaces and to compress the sealing portions to have a spring rate equal to the total spring rate of said plurality of protrusions.

9. The gasket as claimed in claim 8 wherein each of the plurality of sleeve means is molded integrally with each of the plurality of cylindrical protrusions.

10. A vibration isolation and sealing gasket comprising: to identical oval bead-shaped sealing portions extending parallel to and spaced apart from each other forming a closed loop; a rectangular cross-section flange connecting said sealing portions; a plurality of hollow cylindrical protrusions integral with and spaced along the closed loop flange and extending perpendicular to a plane defined by the closed loop flange; said plurality of cylindrical protrusions axially convolutable to a configuration wherein the spring rate of the axially convoluted protrusion is equal to the spring rate of the sealing portions when compressed at least a predetermined minimum amount parallel to the axis of said plurality of cylindrical protrusions; and a plurality of sleeve means with each of said sleeve means disposed within one of said plurality of cylindrical protrusions for defining the predetermined minimum amount of compression of the sealing portion parallel to the axes of the plurality of cylindrical protrusions.

11. A vibration isolation and sealing gasket comprising: an oval bead-shaped sealing portion forming a closed loop and having the major axis of the oval perpendicular to the plane of the closed loop; a plurality of flanges extending into said closed loop; a plurality of additional oval bead-shaped sealing portions encircling said plurality of flanges; a plurality of cylindrical protrusions perpendicular to the plane of the closed loop, each of said plurality of cylindrical protrusions integral with one of said plurality of flanges and each having a through-hole provided therein concentric therewith; said plurality of cylindrical protrusion axially convolutable to a configuration wherein the spring rate of the axially convoluted protrusion is equal to the spring rate of the sealing portions when compressed at least a predetermined minimum amount parallel to the axis of said plurality of cylindrical protrusions; a plurality of sleeve means with each of said sleeve means disposed within one of said plurality of cylindrical protrusions for establishing the predetermined minimum amount of compression of the sealing portion parallel to the axes of the plurality of cylindrical protrusions; and a metal stabilizing band embedded in the oval bead-shaped sealing portion encircling the outer perpendicular to the plane of the closed loop.

* * * * *

UNITED STATES PATENT OFFICE
CERTIFICATE OF CORRECTION

Patent No. 4,067,531      Dated 10 January 1978

Inventor(s) William John Sikula

It is certified that error appears in the above-identified patent and that said Letters Patent are hereby corrected as shown below:

Cover Sheet, [73] Assignee: change "Derre & Company" to --Deere & Company--.

Column 4, line 67, delete "to" and insert -- two --.

Column 6, line 19, after "outer" insert -- periphery thereof to hold the major axis of the oval --.

Signed and Sealed this

Ninth Day of May 1978

[SEAL]

Attest:

RUTH C. MASON
Attesting Officer

LUTRELLE F. PARKER
Acting Commissioner of Patents and Trademarks